United States Patent Office 3,393,196
Patented July 16, 1968

3,393,196
PROCESS FOR THE MANUFACTURE OF ARYL MERCURY AMMONIUM COMPOUNDS
Seymour J. Lederer, Fair Lawn, Henry E. Jecker, Jr., West Milford Township, Passaic County, and James Houstoun, South Orange, N.J., assignors, by mesne assignments, to Merck & Co., Inc., Rahway, N.J., a corporation of New Jersey
No Drawing. Filed Sept. 9, 1963, Ser. No. 307,331
6 Claims. (Cl. 260—270)

The present invention relates to an improved process for the manufacture of organic mercury compounds, to novel compounds obtained thereby, and to fungicidal, bactericidal and herbicidal compositions, and also coating compositions and antiseptic preparations, containing the products of such process.

More specifically, the invention relates to improved procedures for the manufacture of certain aryl mercury ammonium compounds whose chemical structure is not known but whose analysis leads to the empirical formula $$R_2Hg_2NH_2.X$$

wherein R represents an otherwise unsubstituted or a further substituted benzene radical, including naphthyl, and the substituting groups, when present, being one or more halogens, particularly chlorine, or nitro, hydroxy, carboxy, or aliphatic hydrocarbon, and particularly alkyl of one to six carbon atoms, but also butadienylene (in the case of naphthyl); while X represents the residue of an inorganic or organic compound having an active acidic hydrogen atom, X being, for example, the acid or acyl group of a monobasic or polybasic inorganic acid, such as a halogen atom, preferably chlorine but also bromine or iodine, or a sulfate, nitrate, phosphate, metaphosphate, orthophosphate, or borate radical, or an acyloxy group of a saturated or unsaturated monobasic or polybasic aliphatic acid, or of an aromatic, cycloaliphatic, or heterocyclic carboxylic or sulfonic acid, otherwise unsubstituted, or substituted as by halogen, nitro, hydroxy, an alkyl group of 1 to 4 carbon atoms, or the like; the acids or acid substances including saturated and unsaturated aliphatic acids of 1 to 22 carbon atoms, benzene carboxylic, dicarboxylic and hexacarboxylic acids and sulfonic acids, pyridine carboxylic acids, and furoic acid; phenates, including those of hydroxybenzene, hydroxynaphthalene, 8-hydroxyquinoline, hydroxypyridine, and hydroxypyrimidine; benzene sulfonamide; compounds having a reactive methylene group, like barbituric acid; thiols, both aliphatic and cyclic; enols, and the like.

Examples of compounds prepared in accordance with the process of the invention are diphenyl dimercuric ammonium chloride, sulfate, nitrate, phosphate, borate, formate, acetate, chloroacetate, trichloroacetate, propionate, dibromopropionate, butyrate, 2-ethyl-hexanoate, laurate, myristate, oleate, linolenate, linoleate, lactate, behenate, stearate, oxalate, malonate, succinate, tartrate, maleate, citrate, gluconate, acrylate, methacrylate, benzoate, p-nitrobenzoate, p-chlorobenzoate, phthalate, isophthalate, and terephthalate, mellitate (monoform), sulfamate, nicotinate, isonicotinate, cyclopentyl and cyclohexyl carboxylate, phenate, o-nitrophenate, o-chlorophenate, 2,4,5- and 2,4,6 - trichlorophenates, o, m, and p-cresolates, the 2,5- and 2,6- and 3,4-xylenolates, resorcinolate, 8-hydroxyquinolinate, furoate, p - toluenesulfonate, p - chlorobenzenesulfonate, benzene sulfonamide, benzenesulfonate, barbiturate, thioglycollate and isooctyl thioglycollate, thiophenate, thiosalicylate, ethyl acetoacetate, p-hydroxy phenyl arsonate and arsenate; anthraquinone-2,3-dicarboxylate; di-(o-hydroxyphenylmercuric) ammonium halides, e.g., chlorides and bromides; and other salts disclosed hereinafter. In the case of the polybasic acids, both inorganic and organic, the invention contemplates also the partially neutralized acids, the remaining acid or acidic group or groups (whether carboxylic, sulfonic, phenolic hydroxyl, or the like) being preferably neutralized with a basic inorganic radical, like ammonium, sodium, and the like.

It is the general object of the invention to provide an improved process for the manufacture of the above-mentioned compounds whereby they are obtained in good yield and in easily usable form.

It is a further object of the invention to provide a new organic mercury compounds which are characterized by a high degree of activity against various fungi and bacteria.

An additional object of the invention is to provide organic mercury compounds having a powerful herbicidal action and, in particular, a selective action toward crabgrass.

It is also an object of the invention to provide organic mercury compounds in a relatively highly water-soluble form, and, in particular, compounds which can be easily dissolved in water so that they can be marketed in the solid form and present no difficulty to the user in preparing solutions of high concentration.

Still further objects of the invention are to provide organic mercury compounds of such character that they remain active for a relatively long period of time in the presence of sulfur or sulfhydryl radicals and so are particularly useful as slimicides in paper and pulp and other industries; to provide organic mercury compounds characterized by a powerful antimicrobial action in low nontoxic concentrations and hence useful in general antisepsis; and to provide concentrated and stable solutions of di-aryl di-mercuric ammonium hydroxide which can be reacted with compounds having an acidic hydrogen, e.g., organic and inorganic acids, phenols, sulfonic acids, mercaptans, enols, and the like, and their salts, to produce the corresponding di-aryl di-mercuric ammonium salts.

The exact structure of the compounds of the present invention, as already indicated is not definitely known, although the percentage composition corresponds to the above empirical formula. The group X possible has the structure of an acid or acyloxy group which is linked directly to the nitrogen; and that similarly in the case of the phenates, the aromatic nucleus is linked to the nitrogen through an oxygen atom. The linkage of the "R" groups with reference to the mercury atoms and to the nitrogen atom, has not, however, been conclusively established. The compounds may be composed of two associated compounds or consist of double compounds as indicated by the following formula R—Hg—NH₂
R—Hg—X the dot indicating some kind of stable interrelationship. For convenience, however, the compounds will be referred to as diaryl (or diphenyl) dimercuric ammonium compounds.

Accordingly, the formulas presented herein are empirical, although the carbons and hydrogens will not be summed up where the integrity of different radicals, such as phenyl, acyloxy, and the like is believed to be maintained in the final product.

According to the present invention, compounds of the empirical formula $R_2Hg_2NH_2X$, wherein R and X are as shown above defined, are obtained in one or more steps, depending on the nature of the starting mercury compound, but including a reaction involving the use of anhydrous ammonia, preferably in excess, and of a substantially anhydrous organic solvent. The solvent can be of great variety, both aliphatic and aromatic, and either miscible or non-miscible with water, and includes the lower aliphatic alcohols, like methanol, ethanol, propanol and isopropanol, hydrocarbons like benzene, toluene and xylene, substituted benzenes like chlorbenzene and nitrobenzene, various ethers, like diethyl, and di-isopropyl ether, Cellosolve, dioxane, and the like. The treatment with dry ammonia gas in a substantially anhydrous organic solvent can be conducted in several ways, as described in detail hereinafter.

The present invention is based on our discovery that diaryl, dimercuric ammonium salts of inorganic and organic acids and of other compounds having an acidic hydrogen atom can be prepared and recovered in a high state of purity, if the reaction with ammonia is caused to take place under substantially anhydrous conditions in an organic solvent, and especially if the salt formation is caused to occur by way of the diaryl dimercuric ammonium hydroxide, which is reacted directly with the compound having an acidic hydrogen, or with a salt thereof.

We have found that high concentrations of, for example, diphenyl dimercuric ammonium hydroxide can be obtained by passing anhydrous ammonia through a solution or suspension of phenylmercuric hydroxide in a suitable organic solvent, such as methyl alcohol. Thus, in the case of diphenyl dimercuric ammonium hydroxide, which represents the preferred compound of this type, concentrations as high as 65% and more have been obtained. The solution of the hydroxide was found to be stable even at very low temperatures, such as that of a Dry Ice-methanol mixture.

The solutions of the diphenyl dimercuric ammonium hydroxide are excellent starting materials for the preparation of various salts wherein the anion of an acid or salt replaces the hydroxy group. Thus, treatment of a concentrated solution of diphenyl dimercuric ammonium hydroxide with ammonium chloride yielded a white precipitate which melts at 185° C. and analyzed for the composition $(C_6H_5)_2Hg_2NH_2Cl$. The chloride could also be a solution of hydrochloric acid to a solution of the hydroxide. The propionate was obtained by adding to the methanolic solution of the hydroxide a methanolic solution of ammonium propionate or of propionic acid. Sodium propionate (solid) yielded only a gum which, however, melted at 185–187° C., the melting point of the product obtained with non-aqueous ammonium propionate or with propionic acid.

According to the invention, therefore, diphenyl dimercuric ammonium hydroxide and other diaryl dimercuric ammonium hydroxides are employed as highly efficient and convenient reagents in solution in an organic solvent for the preparation of the corresponding salts whereby the hydroxyl of the hydroxide is replaced by the residue of an organic or inorganic compound having an acidic hydrogen. Thus methanolic solutions of diphenyl dimercuric ammonium hydroxide can be reacted directly and in stoichiometric quantities with acid-reacting compounds generally to form diphenyl dimercuric ammonium salts. The general applicability of this process has been further demonstrated by the reaction of the solution of the hydroxides with many other types of acid-reacting compounds, as indicated hereinabove. Each of the different groups of compounds having an acidic hydrogen yielded the corresponding metathetical reaction products.

In the case of the preparation of the diphenyl dimercuric ammonium salts of a phenol, including 8-hydroxyquinoline, we have found a reliable procedure to be by way of phenyl mercuric hydroxide. Thus, on suspending about 2 moles of phenyl mercuric hydroxide in ether with one mole of the quinoline compound or other phenol, and bubbling through anhydrous ammonia at reflux (35° C.), the desired phenate or 8-quinolinolate salt is obtained.

The diaryl dimercuric ammonium salts may thus be prepared in accordance with one or more of the following procedures:

(1) By reacting a compound of the formula RHgOH with dry ammonia gas in an anhydrous organic solvent in which the intermediately formed diaryl dimercuric ammonium hydroxide compound is soluble, like the lower alkanols, followed by treatment with an acidic compound or a salt thereof. The solution of the formed hydroxide, when reacted with a compound having an acidic hydrogen atom or a salt of such compound, produces the compound $R_2Hg_2NH_2X$. This latter reaction is of very general applicability and we have been unable to find any compound with an acidic hydrogen atom among the many hundreds which we have investigated which did not react with the solution of the hydroxide compound to form the corresponding X-derivative.

(2) The compound RHgX is an organic solvent, such as one of those named hereinabove, the compound being suspended or dissolved in the solvent, is treated with dry ammonia gas at temperatures ranging from about 10° to 100° C., the range of about 20° to 45° being preferred. The ammonia gas is bubbled through the solution or suspension, and as in the other alternative procedures, is employed in excess. The use of the salt RHgX in a suitable organic solvent represents a quite general method for preparing the desired compounds. Many compounds of the formula RHgX react with the ammonia at room temperature, but certain of them, such as phenyl mercuric butyrate, do not react to a considerable degree until a temperature of about 45° C. is applied. The "X" of the formula is the same as defined hereinabove.

(3) A further variation consists in reacting the compound RHgOH with a compound having an acidic hydrogen atom or its salt, and with an excess of dry ammonia gas, in a single step in an organic solvent, such as those named hereinabove. This single step or simultaneous reaction is necessary when the solvent is one in which the corresponding diaryl dimercuric ammonium hydroxide is insoluble, such as the liquid ethers, like ethyl ether and di-isopropyl ether.

We prefer to use a compound having an acidic hydrogen atom, usually an acid, in the free condition; and where a salt is employed, we prefer to employ an ammonium salt. However, there can be employed also an amine salt, such as the triethyl amine salt in an organic solvent, which affords the advantage over alkali-metal salts that the amine compound formed by metathesis is usually soluble in the organic solvent, whereas alkali metal salts are generally insoluble in organic solvents and therefore would precipitate with the desired compound.

In carrying out procedure No. 2, it is of advantage to employ organic solvents in which the desired salt is insoluble. Thus to prepare the propionate salt, phenylmercuric propionate is dissolved in benzene and dry ammonia is bubbled through the solution. The salt is precipitated and can be readily separated. In some cases, heating to about 45°, or to reflux (55°–75° C.), depending on the solvent, will be necessary. The benzene can generally be replaced by other aromatic solvents like toluene and xylene.

The compounds of the invention are highly active fungicides and bactericides and have also been found to be destructive to weeds like crabgrass. As described more fully hereinbelow, they can be employed in various industries to control fungal and bacterial growth, as in the paper industry, in paints and other coating compositions, and, because of their low toxicity, can be used as internal and external antiseptics for man and the lower animals.

The invention will be further described by way of illustration in the following examples which are not intended to indicate the limits of the invention.

Example 1

Ninety grams of phenylmercuric hydroxide (PMOH) were suspended in 70 cc. of refluxing methanol and anhydrous ammonia was passed through the mixture. The feed of ammonia was continued to saturation. A clear stable solution was obtained which contained the equivalent of 62% of diphenyl dimercuric hydroxide, or 42% mercury. This contrasts with the normal solubility of phenylmercuric hydroxide in methanol of only 5%. Attempts to freeze out the product with Dry Ice gave only a gum which could not be further characterized. The addition of water also yielded a gum.

A larger run was made by reacting 159 gms. of PMOH in 180 cc. of methanol with gaseous ammonia. The resulting solution was treated with a series of compounds at equimolar ratios with the following results: Ammonium propionate in methanolic solution gave the propionate salt, melting at 185° C. Solid sodium propionate yielded a gum; while the liquid propionic gave the propionate salt with a melting point of 186° C. Ammonium chloride in methanolic solution gave the chloride melting at 180–185° C.; while solid sodium chloride and a solution of hydrochloric acid yielded chlorides melting at 185° C. and 180–185° C., respectively.

Example 2

58.8 grams of phenyl mercuric hydroxide were suspended in 60 cc. of methanol. Anhydrous ammonia was bubbled through and complete solution was obtained. There were then added slowly, with agitation, 7.4 gms. of propionic acid. There was an immediate heavy precipitate. The product was separated and dried. It melted at 186° C. and analyzed for diphenyl dimercuric ammonium propionate.

*Analysis.*—Hg theory, 62.4%; found, 62.5%. N theory, 2.2%; found, 2.1%.

Example 3

67 grams of phenyl mercuric hydroxide were suspended in 60 cc. of methanol and anhydrous ammonia was bubbled through. To the solution were then added 22.8 gms. of lauric acid and the mixture was stirred for 1 hour. A clear solution resulted. The solution was then added slowly with stirring to 2 liters of water. The white precipitate which came out was filtered and dried. It melted at 100–105° C. and analyzed 51.6% Hg; theory for the laurate=52.1% Hg.

Example 4

67 grams of phenylmercuric hydroxide were suspended in 60 cc. of isopropanol and converted to diphenyl dimercuric ammonium hydroxide as above. 30.9 grams of stearic acid were added, with stirring to the suspension. The solution was kept at 0° C. for 24 hours and filtered. The product analyzed 47.4% Hg; theory for the stearate=47.1% Hg.

Example 5

2.87 grams of oleic acid were mixed with 50 cc. of ethyl ether. To the mixture were added 5.88 gms. of phenyl mercuric hydroxide, and anhydrous ammonia was added with agitation. The white insoluble precipitate was filtered and found to be slightly waxy. The compound analyzed 46.9% Hg; theory for diphenyl dimercuric ammonium oleate=47.2% Hg.

Example 6

Into a flask fitted for reflux there were introduced 1.48 gms. propionic acid and 100 cc. of ethyl ether. To this mixture were added 11.76 gms. of phenyl mercuric hydroxide, the mixture then heated to reflux on a water bath and dry ammonia gas was bubbled through. Filtration gave a white solid which was identified as diphenyl dimercuric ammonium propionate melting at 185–187° C.

Example 7

To 8.65 grams of 2-ethyl-hexoic acid in 150 cc. of di-isopropyl ether there were added 35.3 gms. of phenyl mercuric hydroxide. Anhydrous ammonia was bubbled through the mixture. Filtration gave a product which contained 56.1% Hg; theory for diphenyl dimercuric ammonium 2-ethyl hexanoate is 56.1% Hg.

Example 8

11.2 grams of undecylenic acid were suspended in 100 cc. of dioxane. 35.3 grams of phenyl mercuric hydroxide were added. Anhydrous ammonia was bubbled through with stirring to yield diphenyl dimercuric ammonium undecylenate.

Hg found=52.8%; Hg theory=53.1%.

Example 9

To 52 cc. of a methanolic solution containing 0.06 M of diphenyl dimercuric ammonium hydroxide there were added 4.56 gms. of glycolic acid. A thick precipitate formed. The reaction was cooled at 5° C. for 15 minutes and filtered to yield the diphenyl dimercuric ammonium glycollate, M.P. 193–195° C.

*Analysis.*—Hg found 62.1%; theory 62.0%. N found 2.14%; theory 2.16%.

Example 10

To 60 gms. of a methanolic solution containing 0.06 M of diphenyl dimercuric ammonium hydroxide there were added 5.4 gms. of lactic acid. On cooling at 0° C. for 48 hours and filtering, there was obtained a white solid melting at 159–160° C., which analyzed 60.8% Hg; theory for diphenyl dimercuric ammonium lactate=60.9% Hg.

Example 11

To 15 gms. of a methanolic solution containing 0.015 M of diphenyl dimercuric ammonium hydroxide were added 1.83 gms. (0.015 M) of benzoic acid. The mixture was stirred for 5 minutes, whereupon a clear solution was obtained. After 15 minutes' additional stirring, a thick precipitate formed which was separated and dried, yielding a product melting at 150–154° C., which proved to be diphenyl dimercuric ammonium benzoate.

*Analysis.*—N found=1.9%; N theory=2.0%.

Example 12

To 20 cc. of ethanol containing 0.02 M of diphenyl dimercuric ammonium hydroxide, 3.8 gms. of p-toluene sulfonic acid were added. A thick precipitate was formed. Filtration gave a product melting at 178–183° C.

*Analysis.*—N found=1.9%; N theory=1.8%.

Example 13

In a flask fitted for reflux there were introduced 1.88 gms. (0.02 M) of phenol and 100 cc. of ethyl ether. The mixture was stirred to give a uniformly distributed mass and heated to reflux. There were then added 11.76 gms. of phenyl mercuric hydroxide, and anhydrous ammonia was bubbled through for 20 minutes. A white precipitate of diphenyl dimercuric ammonium phenate was obtained which on filtering and drying, melted at 104–107° C.

*Analysis.*—Hg found=61.0%; Hg theory=60.5%.

Example 14

A 4.3 gm. methanolic solution containing 0.005 M of diphenyl dimercuric ammonium hydroxide was heated to 50° C. and there was added slowly with agitation 0.65 gm. (0.005 M) of ethyl aceto-acetate. There was an immediate thick precipitate. Filtration gave a white product melting at 205–208° C.

*Analysis.*—Hg found=57.9%; Hg theoretical 57.4%.

Example 15

4.3 grams of an n-propanolic solution containing 0.005 M of diphenyl dimercuric ammonium hydroxide was warmed to 45° C. To this was added 0.785 gm. (0.005 M) of benzene sulfonamide dissolved in 3 cc. of hot methanol. The precipitate which formed was filtered and melted at 195–200° C.

*Analysis.*—Hg found=55.9%; Hg theoretical=55.4%.

Example 16

0.45 M of diphenyl dimercuric ammonium hydroxide in 50 gms. of methanol was warmed to 30° C. A suspension of 7.4 gms. (0.045 M) of barbituric acid in 50 cc. of hot methanol was added with stirring. A very thick precipitate formed and 50 cc. additional methanol were added to permit agitation. The mixture was stirred for 1 hour and filtered. The product decomposed above 275° C. and analyzed as diphenyl dimercuric ammonium barbiturate.

Example 17

30 cc. of a methanolic solution containing 0.0345 M of diphenyl dimercuric ammonium hydroxide were stirred in an ice bath. To it was added a chilled solution of 6.7 gms. (0.0345 M) of iso-octyl thioglycollate in 10 cc. of methanol. A yellowish solid precipitated which gummed as addition continued. After complete addition of the thio compound, a heavy oil separated out which did not crystallize after 5 days at 0° C. The oil was then triturated with ethyl ether and converted to a solid with a yellowish cast, and analyzed as the diphenyl dimercuric ammonium iso-octyl thioglycollate.

By proceeding as above described, e.g., by the use of an alcohol or ether as solvent, there have been prepared also the diphenyl dimercuric ammonium salts of other acids, including the gluconate, chloroacetate, trichloroacetate, and dibromopropionate, and of many cyclic carboxylic acids, among them nicotinic, isonicotinic, o-aminobenzoic, p-aminobenzoic, salicylic, 3- and 5-bromosalicylic, p-iodobenzoic, o-, m- and p-chlorobenzoic and nitro-benzoic, 3,5-dibromo and dinitro-benzoic, gentisic, furoic, and anthraquinone carboxylic acids, as well as the salts of saturated and unsaturated polycarboxylic acids, including oxalic, succinic, malonic, sebacic, adipic, tartaric, citric, maleic, malic, phthalic, terephthalic, isophthalic, mellitic (mono-form), and anthraquinone-2,2-dicarboxylic acid. Solubility tests conducted on the new compounds showed that, in general, the water solubility was greatly increased, in many instances by as much as 10 to 100 or more times that of the corresponding phenyl mercuric salt. In the case of the polybasic acids, the partial esters or salts are preferably formed by employing an excess of the acid, so that one or more acid groups remain free. Such free acid group or groups can then be partially or wholly neutralized by treatment with a metal hydroxide, carbonate or bicarbonate to form the metal salt, such as the sodium, potassium, or magnesium or other alkaline earth metal salt, or the ammonium salt, which salts are frequently much more soluble than the normal diphenyl dimercuric ammonium salt of the acid. In general, the ammonium salt of the partial polybasic acid diphenyl dimercuric ammonium salt is preferred.

Detailed examples of a number of these different types of acids are presented below by way of illustration:

Example 18

2.08 grams of malonic acid were dissolved in 200 cc. of diethyl ether, and there were stirred in 11.76 g. of phenylmercuric hydroxide in a slurry of 100 cc. more of diethyl ether. The mixture was heated to reflux and stirred for 15 minutes. Anhydrous ammonia was then bubbled in for 1 hour. Filtration gave a white product melting at 140 to 150° C. with decomposition, and containing 58.1% mercury. Theory for mono-ammonium monodiphenyl dimercuric ammonium salt of malonic acid is 58.0% mercury.

Example 19

23.2 grams of maleic acid were dissolved in 500 cc. of diethyl ether. To the solution there were added 11.76 g. of phenylmercuric hydroxide in a slurry with 250 cc. more of diethyl ether. The mixture was heated to reflux and anhydrous ammonia gas was bubbled through for 1 hour. On filtration, there was obtained a white precipitate which decomposed at 145 to 150° C. and contained 56.8% mercury. Theory for the mono-ammonium monodiphenyl dimercuric ammonium maleate is 57.0%. Water solubility: 26.7%.

Example 20

A solution of 11.6 g. of maleic acid in 500 cc. of diethyl ether was prepared and 117.6 g. of phenylmercuric hydroxide added thereto as a slurry in 250 cc. diethyl ether. The mixture was stirred for 5 minutes, and anhydrous ammonia gas was bubbled through for 45 minutes. The mixture settled into a hard mass but loosened on continued stirring.

Filtration gave a white product melting at 155 to 165° C. with decomposition, and contained 63.5% mercury. Theory for di-(diphenyl dimercuric ammonium)-maleate is 63.8% mercury.

Example 21

2.5 grams of B-carboxy anthraquinone were placed in 150 cc. of dipropyl ether and 5.88 g. of phenylmercuric hydroxide added. The mixture was stirred until a uniform mixture was obtained. Anhydrous ammonia gas in excess was bubbled through for 20 minutes.

The product obtained melted at 190 to 193° C. with decomposition and contained 48.7% mercury. Theory for diphenyl dimercuric ammonium anthraquinone carboxylate is 48.7% mercury.

In the following examples, the compound containing the acidic hydrogen atom is a substituted monocyclic or polycyclic phenol which, although normally not a strongly acid compound, is capable of reacting with the relatively strongly basic diaryl dimercuric ammonium hydroxide to form stable salts with pronounced antimicrobial properties.

Example 22

30 grams of o-chloromercuric phenol were dissolved in 100 cc. of Cellosolve (ethylene glycol monoethyl ether) at 40° C. Anhydrous ammonia was bubbled through and after 2 minutes a white solid came down. The feed of ammonia was continued for 20 minutes. The solution was filtered to yield a white solid which did not melt at 250° C.

*Analysis.*—Hg found=63.6%; Hg theoretical (for di-[orthohydroxyphenyl] di - mercuric ammonium chloride)=63.0%.

Example 23

Thirty gms. of methanol containing 0.02 mole of diphenyl dimercuric ammonium hydroxide were agitated vigorously and 2.8 gms. (0.02 M) of o-nitro phenol were added. Agitation was continued for 1 hour. A thick red-orange precipitate of diphenyl dimercuric ammonium-o-nitrophenate was formed. Filtration and drying gave a product melting at 170–175° C.

N found=2.0%; N theory=2.0%.

Example 24

To 20 gms. of an ethanolic solution containing 0.02 mole of diphenyl dimercuric ammonium hydroxide were added 2.6 gms. (0.02 M) of o-chlorophenol. The thick white precipitate of diphenyl dimercuric ammonium-o-chlorophenate which formed was filtered and dried. It melted at 135–140° C.

N found=1.9%; N theory=2.0%.

Example 25

Sixty cc. of methanol containing 0.06 M of diphenyl dimercuric ammonium hydroxide were agitated in a flask and 11.8 gms. (0.06 M) of 2,4,6-trichlorophenol dissolved in 20 cc. of methanol were added. Stirring was continued for 30 minutes. A pale yellow solid, diphenyl dimercuric ammonium-2,4,6-trichlorophenate, was obtained which melted at 183–191° C.

N found=1.8%; N theory=1.8%.

Example 26

Sixty gms. of methanol containing 0.06 M of diphenyl dimercuric ammonium hydroxide were placed in a flask fitted with an agitator and reflux condenser. The solution was heated to 50–55° C. and a hot solution of 15.1 gms. (0.06 M) of 2,3,4,6-tetrachlorophenol in 20 cc. of warm methanol was added. The solution became hazy and on continued stirring at 50° C., cleared up. The solution was cooled to 0° C. for 24 hours and a light tan precipitate of diphenyl dimercuric ammonium-2,3,4,6-tetrachlorophenate formed which melted at 190–194° C.

Hg found=49.8%; Hg theory=50.1%.

Example 27

Fifty gms. of a methanolic solution containing 0.06 mole of diphenyl dimercuric ammonium hydroxide were heated to 45° C. and 16.7 gms. (0.06 M) of pentachlorphenol dissolved in 10 cc. of methanol at 57° C. were added slowly. A brownish precipitate formed. The mixture was stirred for 2 hours and kept at 0° C. for 24 hours. The tan precipitate melted at 210–212° C. and analyzed 48.0% Hg. Theory for diphenyl dimercuric ammonium pentachlorophenate is 48.0% Hg.

Example 28

A solution of 1 mole of diphenyl dimercuric ammonium hydroxide in methanol was heated to 45° C. and an equimolecular amount of phenol was dissolved in warm methanol and slowly mixed therewith. The formed precipitate was stirred and kept at 0° C. for 24 hours. The precipitate was then filtered and dried. The product was diphenyl dimercuric ammonium phenate.

Example 29

210 gms. of an ethanolic solution containing 0.24 M of diphenyl dimercuric ammonium hydroxide were warmed to 50° C. There was added a solution prepared by dissolving 52.4 gms. of technical 2,4,5-trichlorphenol (90% pure) in 80 cc. of ethanol at 40° C. The mixture was stirred for 15 minutes and cooled at −10° C. for 24 hours. A cream colored solid, diphenyl dimercuric ammonium 2,4,5-trichlorphenate, was formed which did not melt below 220° C.

Hg found=52.2%; Hg theory=52.4%.

Example 30

Into a one-liter flask equipped for reflux there were charged 29 gms. (0.2 M) of 8-hydroxyquinoline and 700 cc. of diethylether. The mixture was stirred for 10 minutes, and after 118 gms. (0.4 M) of phenyl mercuric hydroxide had been added, it was heated to reflux and anhydrous ammonia gas was passed through the mixture for 1.5 hours. Filtration gave a light yellow precipitate of di-(phenylmercuric)ammonium-8-hydroxyquinolinate. M.P. 120–126° C.

Hg found=56.1%; Hg theory=56.1%.

FORMULATIONS OF THE DIPHENYL DIMERCURIC AMMONIUM COMPOUNDS

I. Solid compositions.—Phenyl mercurials have been used in the past in solid form in a number of applications, as in paper mills as a slimicide, and in agriculture as a seed fungicide. One difficulty that has limited the use of the known compounds has been that, for example, phenyl mercuric acetate, and the phenyl mercurials in general, are rather hydrophobic and do not easily wet in aqueous systems. It has accordingly been necessary to include various dispersing and/or wetting agents with the phenyl mercurial to prevent agglomeration and insure distribution. Many of these agents are phytotoxic or are undesirable for other reasons, such as destruction of emulsions or reaction with a part of the system. Anionic wetting agents, which are widely used in industry, cannot be used since they would react with the phenyl mercurial.

We have found that the diphenyl dimercuric ammonium compounds above described have the property of being self-detergents and become distributed rapidly in aqueous systems without added wetting agents. As a result, the diphenyl dimercuric ammonium compounds are capable of wide application in various fields and industries. Tests of the solid form in paper mills have given excellent results, with no agglomeration, and very good distribution through the system. Within several seconds after addition, an active concentration of, for example, the diphenyl dimercuric ammonium propionate was obtained.

When desired for certain specific uses, the diphenyl dimercuric ammonium compounds, for example, can be diluted with an inert carrier such as talc, clay, or any of the synthetic silicates. As already indicated, no wetting agents are required. However, where a wetting agent should be desired in certain special uses, any of the commonly employed types can be included in the formulation, about 0.01–2.0% being adequate for most purposes. Among these are the non-ionics, such as the condensation products of ethylene oxide or propylene oxide, and polyoxyethylene, or prepared by addition of ethylene or propylene oxide to polypropylene glycols, like the "Pluronics," or the alkyl phenyl polyethylene glycol ethers, like the "Tergitols."

Example A 900 lbs. of clay and 100 lbs. of diphenyl dimercuric ammonium propionate were ground in a hammer-mill and the resulting mixture was found useful in agricultural slurry and spray treatments for seeds, plants and soil, as a fungistat and fungicide.

Example B

When a more highly concentrated mixture is desired for the treatment of slime in the paper and pulp industries, 80 lbs. of diphenyl dimercuric ammonium propionate and 20 lbs. of "Hy-flo" are ground together. The product is easily wettable and distributed rapidly and uniformly through the circulating water system. Similar mixtures can be prepared with the other diphenyl dimercuric ammonium lower alkanoates and with the other salts and partial salts or their ammonium salts (ammonia-neutralized partial salts) above described.

II. Liquid formulations.—The diphenyl dimercuric ammonium compounds can be dissolved in water to useful concentrations without the aid of solubilizing salts or organic solvent additions. Thus, stirring in warm water will dissolve diphenyl dimercuric ammonium propionate to the extent of 5 to 8%. We have, however, found that our improved diphenyl dimercuric ammonium salts are stable at higher concentrations in aqueous solution with soluble binary ammonium salts, like the acetate, propionate, and other lower alkanoates and with the sulfate and other soluble inorganic salts, to the extent of about 1 mole of the diphenyl dimercuric ammonium salt to 2 or 3 moles of the ammonium salt. This mixture can also contain free ammonia and/or primary, secondary and tertiary amines, like ethyl, propyl, butyl and other lower alkyl amines; various lower alkanolamines, like ethanolamine and propanolamine, diethylamine, dipropylamine, diamylamine, diethanolamine, dipropanolamine, morpholine, trimethyl and triethylamines, triethanolamine, and the like. Thus, 4% ammonium acetate will give a 10% aqueous solution of diphenyl dimercuric ammonium propionate, and 10% ammonium sulfate will give a 9.2% solution. A 5% addition of ammonium acetate will give a 13% solution of diphenyl dimercuric ammonium acetate in water. The addition of a small amount of a short chain monohydric aliphatic alcohol, or of a polyhydric alcohol, like glycol, can be added to increase the low temperature stability of the solution. Ammonium acetate is, in general, the preferred ammonium salt to be added.

When an ammonium salt is employed to increase the solubility of the diphenyl dimercuric ammonium compounds in water, its content is preferably within the range of about 2.5 to 10% by weight of the solution. The addition of a short chain alcohol, i.e., methanol, ethanol, n-propanol, or isopropanol, or a glycol such as ethylene glycol, propylene glycol or Cellosolve (ethylene glycol monoethyl ether), to the extent of about 5-15%, will aid in the low temperature stability of the solutions but are not necessary for the preparation of the solution. The solutions can be used as slimicides, for seed treatment, for impregnation of fabrics for mildew-proofing, and the like.

Example C 120 grams of diphenyl dimercuric ammonium propionate, 50 gms. of ammonium acetate, 100 gms. of methanol and 750 gms. of water were stirred and filtered to yield a solution containing 12% of diphenyl dimercuric ammonium propionate.

Example D 150 grams of diphenyl dimercuric ammonium acetate were stirred in 1800 gms. of water. The solution was filtered to give a solution containing 7.5% of the acetate.

Example E 100 grams of diphenyl dimercuric ammonium propionate, 200 gms. of ammonium acetate and 700 gms. of water were stirred to yield a solution containing 13% of the propionate.

Example F

Twenty grams of diphenyl dimercuric ammonium propionate, 5 gms. of ammonium sulfate and 175 gms. of water gave a solution containing 9% of the mercurial.

Example G

Ten grams of diphenyl dimercuric ammonium propionate, 5 cc. of ethylene glycol, 2.5 gms. of ammonium acetate, and 85 gms. of water gave a solution containing 8% of the mercurial salt.

Example H

A quantity of diphenyl dimercuric ammonium propionate was dissolved in water together with ammonium acetate and methanol and gave a solution containing 9.6% of the propionate (equivalent to 6.0% Hg), 5% ammonium acetate and 10% methanol.

Example I

A solution was prepared by stirring 100 gms. of diphenyl dimercuric ammonium 8-hydroxyquinolinate, 100 gms. of methanol, 50 gms. of ammonium acetate, and 750 gms. of water. The resulting clear, stable solution contained 10% of the mercurial and was completely dilutable with water at all concentrations.

Example J

Eight grams of diphenyl dimercuric ammonium 2,4,6-trichlorphenate, 10 grams of methanol, 7.5 grams of ammonium acetate and 75 gms. of water were stirred 35 minutes at 35° C. The solution was filtered to yield a clear, stable solution containing 5% of diphenyl dimercuric ammonium 2,4,6-trichlorphenate. This solution is readily diluted with water with no precipitation.

Example K

Another composition contains the following ingredients:

| | Grams |
|---|---|
| Methanol | 30 |
| 10% ammonium acetate solution in water | 105 |
| Diphenyl dimercuric ammonium propionate | 40 |
| Water | 165 |
| Morpholine | 15 |

The mixture of methanol, ammonium acetate, diphenyl dimercuric ammonium propionate and water is heated on the water bath to an internal temperature of 60° C. It is then cooled to 25° and the 15 grams of morpholine are added to the mixture which is then filtered. The solution contains 12% of the propionate and is useful especially as a slimicide in the paper pulp industry.

What we claim is:

1. The process for the manufacture of antimicrobial compounds which comprises reacting an aryl mercuric hydroxide with dry ammonia gas in a substantially anhydrous organic solvent and then treating the reaction product under substantially anhydrous conditions with a compound having an acidic hydrogen or a salt thereof wherein the salt is an ammonium or amine salt.

2. Process according to claim 1 where the aryl radical is phenyl, halophenyl, nitrophenyl, hydroxyphenyl, carboxyphenyl, alkylphenyl or naphthyl, the alkyl group or groups having from one to six carbon atoms.

3. Process according to claim 2 wherein the aryl group is phenyl.

4. Process according to claim 3 wherein the compound having an acidic hydrogen is an organic, inorganic acid or a phenol.

5. The process according to claim 4 wherein the phenol is 8-hydroxyquinoline.

6. The process according to claim 4 wherein the organic acid is propionic acid.

References Cited

UNITED STATES PATENTS

| | | | |
|---|---|---|---|
| 2,135,553 | 11/1938 | Andersen | 260—433 X |
| 2,423,262 | 7/1947 | Sowa | 260—434 |
| 2,754,241 | 7/1956 | Schwerdle | 167—38.5 X |
| 2,913,470 | 11/1959 | Heininger | 260—433 |
| 2,942,018 | 6/1960 | Kobayashi et al. | 260—433 |
| 2,944,967 | 7/1960 | Dunklin et al. | 210—64 |
| 2,999,810 | 9/1961 | Sundholm et al. | 210—64 |
| 3,034,957 | 5/1962 | Smith et al. | 167—38.5 |
| 3,041,188 | 6/1962 | Kageyama et al. | 106—15 |

OTHER REFERENCES

Whitmore, Frank C.: Organic Compounds of Mercury, Chemical Catalog Company, Inc., New York 1921, p. 164, paragraph 8.

Pesci, L.: La Gazzetta Chimica Italiana, vol. 39, I (1909), pp. 147 to 150.

Lederer et al.: Tappi, vol. 43, No. 2 (February 1960), pp. 161 and 162.

Bremster: Organic Chemistry, Prentice Hall, Inc., New York (1948), p. 186.

Moeller: Inorganic Chemistry, John Wiley and Sons, Inc., New York (1954), p. 576.

TOBIAS E. LEVOW, Primary Examiner.

E. C. BARTLETT, H. M. S. SNEED, Assistant Examiners.